United States Patent [19]
Wurdeman et al.

[11] 3,834,294
[45] Sept. 10, 1974

[54] GRAIN DRYER AND AERATOR

[76] Inventors: Marion E. Wurdeman; James A. Wurdeman, both of Columbus, Nebr.

[22] Filed: Mar. 26, 1973

[21] Appl. No.: 344,828

[52] U.S. Cl. ........................ 98/57, 34/202, 34/241, 98/55
[51] Int. Cl. ............................................. B65g 3/08
[58] Field of Search ................................ 98/57, 55; 34/135–137, 210, 202, 240, 241; 165/59

[56] References Cited
UNITED STATES PATENTS

| | | | |
|---|---|---|---|
| 2,645,991 | 7/1953 | Hobson | 98/55 |
| 2,949,843 | 8/1960 | Mack | 98/57 |
| 2,966,110 | 12/1960 | Burfield et al. | 98/57 |
| 3,106,148 | 10/1963 | Bothe et al. | 98/57 |
| 3,531,874 | 10/1970 | Sukap | 98/55 |
| 3,745,669 | 7/1973 | Meiners | 98/55 |

Primary Examiner—Meyer Perlin
Assistant Examiner—Henry C. Yuen
Attorney, Agent, or Firm—Hiram A. Sturges

[57] ABSTRACT

A grain dryer and aerator having a long tubular portion with auger threads on its forward end and a removable fan housing on its rearward end, the tubular portion having a reinforced part with handle mounting aperture means therethrough, the aperture means being blocked by a portion of the fan housing.

4 Claims, 5 Drawing Figures

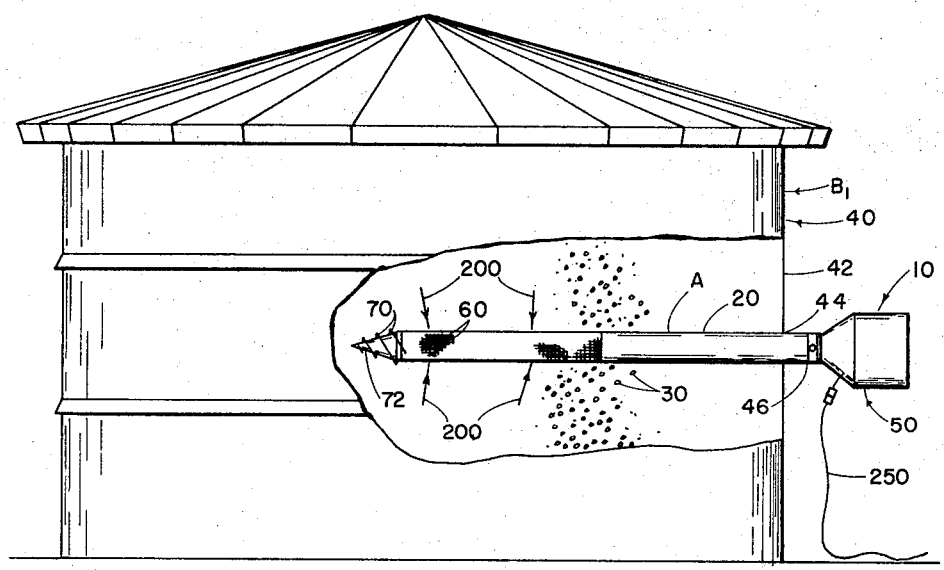
FIG. 1
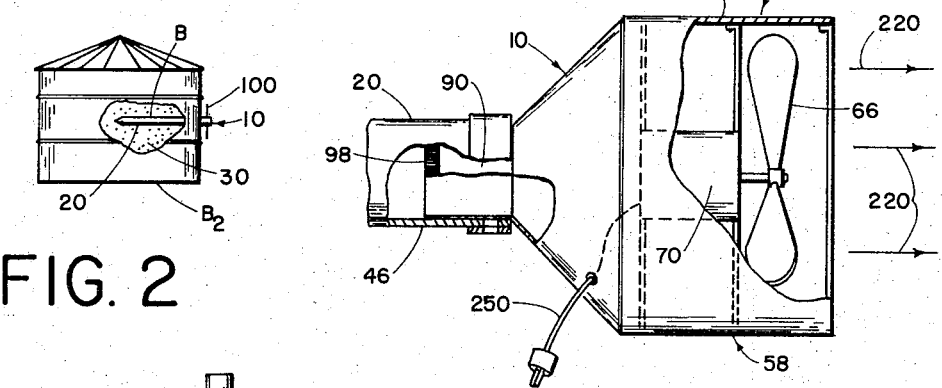
FIG. 2   FIG. 3
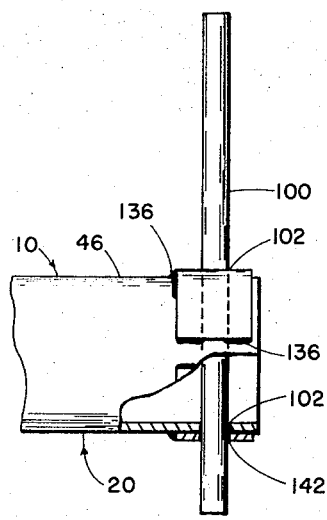   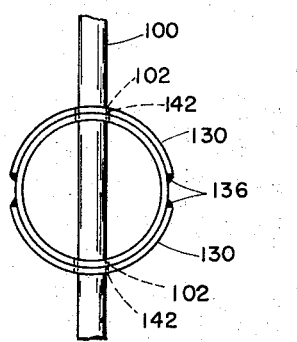
FIG. 4   FIG. 5

GRAIN DRYER AND AERATOR

FIELD OF THE INVENTION

This invention is in the field of grain dryers and aerators of the type having a tube for insertion into grain, air from the grain being blown out of the grain by a fan at one end of the tube, in which the tube is inserted by twisting it and with the assistance of auger flights on the forward end of the tube.

DESCRIPTION OF THE PRIOR ART

The closest prior art is represented by U.S. Pat. No. 3,106,148, titled: GRAIN AERATOR AND DRYER, issued Oct. 8, 1963, the inventors being Henry B. Bothe and Elmer L. Wurdeman.

The invention described in the said patent accomplished very effective drying and was responsible for the saving of great quantities of grain that might otherwise have rotted. However, the invention of the said patent was in many ways expensive to produce and very difficult to use.

The aerator of the patent had its fan housing rigidly attached to the outer end of its tubular shaft, and the handle was disposed transversely to the shaft and was maintained on the shaft at all times during use.

Such a construction required the operator to stand with the housing at his chest and to reach beyond the housing in a very awkward manner to grip the ends of a handle.

Since the handle was itself disposed forwardly of the forward end of the housing and the housing extended beyond the end of the tubular shaft by substantially more than fifteen inches, it was very, very awkward to apply pressure to the handle even for a large man with long arms. To do so, the operator would need to apply the pressure with his arms out-stretched where his physical leverage is greatly cut down and minimized by having to hold his arms so far out in front of him.

The force required to insert an auger tube into the grain is such that it is hard work for a man of heavyweight proportions and in his best working years.

Another problem with the grain aerator of the said prior art patent was that during the inserting of the auger shaft, the sheet metal of the housing would often become bent until it came in contact with the fan blades, making the best operation impossible until after repairs were made.

A particular problem of the prior art has been that not all farmers are large men, and it is sometimes the situation that during the time required to enlist the services of a man large enough to insert the auger shaft, the grain will spoil.

For example, when grain has been put in the bin at a temperature slightly below freezing and with the grain not completely dry, a serious problem arises when the sun comes out. The sunny side of a grain bin will rise in temperature until the grain is up to 140° Fahrenheit. At such a temperature, grain will rot in a single day. In a single day, valuable grain becomes utterly worthless, with much expensive labor involved in separating the rotted grain on the sunny side of the bin from the good grain on the other side.

Under such circumstances, it is important that a grain dryer auger shaft be so constructed that it can be inserted into grain quickly without having to recruit the strongest man in the neighborhood.

The method of attaching a handle to an auger shaft of the prior art grain aerators has been expensive and it has been necessary for the handle to be disposed a substantial distance inwardly from the outer end of the auger shaft in order for it not to bend the light sheet metal of the auger shaft. If the handle was disposed this extra distance inwardly from the end of the auger shaft, the handle was that much farther away from the operator who must reach around the fan housing to grip the handle.

In the past it has been necessary, whenever it is desired to leave a tubular dryer shaft in the grain at times when the fan is not being used, to have an entire complete set of equipment, both auger tube and fan, tied up at one bin, even though the fan portion is not needed. This is important because it is often the case that after operating a fan for a period of time, it is no longer necessary to operate the fan until some later period.

It is very important that the handle for rotating the shaft be mountable on the shaft in a way in which there are no weak points because the pressure of grain of substantial height above the shaft makes possible breakage at any weak point, especially in view of the fact that cost factors require such shafts to be made of very light gauge metal.

SUMMARY OF THE INVENTION

A grain dryer and aerator comprising an elongated tubular shaft, auger means attached to the outer side of said shaft whereby as said shaft is rotated, it will be drawn into or out of grain, an air blowing assembly having a housing having air inlet and outlet openings and having an air blowing means mounted in said housing for moving air therethrough from the air inlet opening to the air outlet opening, said housing having a forward end disposed in lapping relationship with the outer end of said shaft, means securing the forward end of said housing to said shaft in a removable manner, said shaft being perforated so that air can pass therethrough.

The grain aerator and dryer described above in which the means for removably attaching said housing to said shaft comprises a frictional fit between the lapping portions of said housing and said shaft.

The grain aerator and dryer described in which the rearward end of said housing has aperture means therethrough for facilitating the mounting of a handle thereon for assisting in the rotation of said shaft and in which the lapping portion of the forward end of the housing extends across the said aperture means of said shaft so as to substantially block air flow through said aperture means.

The removable connection means comprising a frictional fit between lapping portions of said housing and said shaft.

BRIEF DESCRIPTION OF THE DRAWING

FIG. 1 is a side elevation of a grain bin shown with the grain dryer and aerator of this invention mounted therein with a portion of the grain bin broken away to show the tubular shaft of the invention, perforated parts of the tubular shaft being partially shown diagramatically and only a portion of the grain in the bin being shown for convenience of illustration.

FIG. 2 shows the shaft portion of the invention inserted into a bin with the fan housing removed and with a handle shown in place, a portion of the side of the bin and of the grain being broken away to show the shaft.

FIG. 3 is a side elevation in detail of a rearward part of the shaft portion and of the fan housing with parts of each broken away and other parts shown in section.

FIG. 4 is a detail showing in side elevation a rearward end of the auger shaft with the handle being inserted into it and part of the shaft being broken away and another part showing in section.

FIG. 5 is a view of the parts shown in FIG. 4 as they would be seen from the right end thereof, with portions of the handle broken away and the tubular shaft being shown in full lines.

DESCRIPTION OF THE PREFERRED EMBODIMENT

In FIG. 1, the grain dryer and aerator of this invention is there generally indicated at 10 and is shown with a forward tubular shaft portion 20 thereof partially inserted into the grain 30 of a grain bin 40 through a sidewall 42 of the bin having an opening 44 therethrough for permitting this insertion.

A rearwardmost portion 46 of the tubular shaft 20 is disposed outside of the bin and a fan or blower assembly 50 is removably attached thereto, as later described.

The tubular shaft 20 has a perforated portion 60 at its forward end so that air can enter the tube 20 through the perforation 60 for travelling rearwardly out through the fan or blower housing 50.

The forward end of the shaft 20 has auger flights extending spirally around its outer surface and connected thereto and tapering inwardly alongside an inwardly tapering forwardmost portion 72 of the housing 50 which terminates substantially in a point.

The fan or blower assembly 50 has a housing 58 having a cylindrical portion 62 in which a fan 66 is drivably mounted on a motor 70 suitably attached to the housing 50.

Forwardly of the cylindrical portion 62, the housing 58 tapers inwardly and connects to a forwardly generally cylindrical portion 90, which latter is disposed removably inside the rearwardmost portion 46 of the shaft 20 with a snug frictional fit so as to hold the housing 58 firmly in place.

The forwardmost tip 98 of the housing portion 90 is crimped all around its circumference so as to be tapered inward slightly toward its forwardmost edge to facilitate insertion into the tubular shaft 20.

As best seen in FIG. 2, the method of inserting the shaft 20 into grain is by means of twisting it so as to make use of the auger flights 71. Such twisting is facilitated by means of a handle 100 which extends transversely to the shaft 20 and extends through its rearwardmost portion 46, as best seen in FIG. 4. In FIG. 4, the handle 100 is seen to extend through openings 102 on each of two opposite sides of the shaft 20. Because the shaft 20 is made of very light gauge metal, it is the concept of this invention to have it reinforced by means of reinforcing strips 130 of arcuate shape, which latter snugly fit the outer side of the shaft 20 and are secured thereto by means of welding 136, the reinforcing strips 130 having openings 142 therethrough which register with the openings 102 so that the handle 100, which is cylindrical on its outer side, can extend through the cylindrical openings 102 and 142 so that a twisting force on the shaft 20 can be applied by gripping the ends of the handle 100.

In operation, the shaft 20 is inserted into a bin at a time when the fan or air blowing assembly 50 is not in place on the shaft 20, and is shown in FIG. 2. The operator will find it possible to apply good leverage on the handle 100 without the bulky air blowing assembly 50 in the way.

After the shaft 20 is inserted to a desired distance into the grain 30, then the handle 100 is slipped out of the tube 20 and laid aside. Next, the fan or air blowing assembly 50 is put in place by inserting its forward end portion 90 into the rearward end of the shaft 20. The friction fit therebetween will hold the fan or air blowing assembly 50 in place.

As best seen in FIG. 1, moist air from the grain 30 can pass into the tube 20 through the perforations 60 in the direction of the arrows 200 and will be drawn through the tube outwardly through the air blowing assembly 50 to be harmlessly dissipated in the atmosphere as indicated by the arrows 220, thereby drying the grain 30.

As best seen in FIG. 3, the cylindrical forwardmost part 90 of the blower housing 58 laps the innerside of the tube 20 in such a way as to extend across the openings 102, thereby blocking air flow therethrough so as to keep atmospheric air from entering into the grain dryer 10, whereby its efficiency is maintained.

As best seen in FIG. 3, and also in FIG. 1, a suitable electric cord means 250 extends from a power source, not shown, to the electric motor 70.

It is important that a farmer can have a single air blowing assembly 50 for a plurality of shafts 20. In this way, at a time when he is blowing air out of one bin, as shown in FIG. 1, he can do this without having removed the shaft 20 from the bin shown in FIG. 2, since the shaft in FIG. 2 is a different shaft. And yet, at a later time, when it is desired to blow air from the shaft 20 of FIG. 2, the same housing 58 can be put on the shaft of FIG. 2. To make this more clear, the shaft shown in the bin of FIG. 1 is given the letter A, while the shaft shown in FIG. 2 is given the letter B, and the bin of FIG. 1 is indicated as being a different bin by designating it as $B_1$, while the bin of FIG. 2 is designated $B_2$.

The farmer is thus able to leave shafts in five different bins while blowing air at two of the five bins by purchasing five shafts and two fan or blowing assemblies 50, saving the cost of buying five complete grain aerator and dryer assemblies of this invention.

We claim:

1. A grain dryer and aerator comprising an elongated tubular shaft having a substantially cylindrical rearwardmost end portion, auger means attached to the outer side of said shaft whereby as said shaft is rotated in a pile of grain, it will be drawn into or out of said grain, an air blowing assembly having a housing having a forward air inlet opening and also having an outlet opening and having an air blowing means mounted in said housing for moving air therethrough from said air inlet opening to said air outlet opening, housing connecting means for removably connecting the forward end of said housing to the rearward end of said shaft in a manner for passage of air between said shaft and said housing through said air inlet opening, said shaft having perforations at its forward end sufficient to let air into said shaft for grain drying purposes, and in which said housing connecting means comprises said housing have a forward end disposed in lapping relationship with the outer end of said shaft, said lapping portions of said housing and said shaft having a close fit and having opposed substantially cylindrical surfaces, and in which the rearward end of said shaft has handle aperture means completely extending therethrough in a direction that is transverse to said elongated shaft, and in which said lapping portion of the forward end of the housing extends across the said handle aperture means so as to substantially block air flow through said handle aperture means.

2. The grain dryer and aerator of claim 1 in which said removable connection means comprises a frictional fit between said lapping portions of said housing and said shaft.

3. The grain dryer and aerator of claim 2 in which said one of said lapping portions is crimped around its circumference so as to be tapered inwardly at its terminal end whereby it fits more easily into the other lapping portion.

4. The grain dryer and aerator of claim 1 in which the lapping portion of said shaft is provided with reinforcing means attached to that side thereof which is opposite the side thereof which opposes said lapping portion of said housing, said reinforcing means surrounding said aperture means.

* * * * *